(12) United States Patent
Hsu et al.

(10) Patent No.: US 11,940,692 B2
(45) Date of Patent: Mar. 26, 2024

(54) ELECTRONIC DEVICE

(71) Applicant: InnoLux Corporation, Miao-Li County (TW)

(72) Inventors: Wei-Tsung Hsu, Miao-Li County (TW); Chun-Fang Chen, Miao-Li County (TW); Wei-Ning Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/156,962

(22) Filed: Jan. 19, 2023

(65) Prior Publication Data
US 2023/0266616 A1 Aug. 24, 2023

(30) Foreign Application Priority Data

Feb. 21, 2022 (CN) .......................... 202210159409.2

(51) Int. Cl.
*G02F 1/13357* (2006.01)
(52) U.S. Cl.
CPC .................................. *G02F 1/1336* (2013.01)
(58) Field of Classification Search
CPC ............. G02F 1/1336; G02F 1/133605; G02F 1/133603; H01L 33/60; H01L 33/486; H01L 25/0753
See application file for complete search history.

(56) References Cited

FOREIGN PATENT DOCUMENTS

| CN | 114442371 A | * | 5/2022 |
|---|---|---|---|
| TW | 200919779 A | | 5/2009 |
| TW | 201308681 A | | 2/2013 |
| TW | 202018931 A | | 5/2020 |

* cited by examiner

*Primary Examiner* — Anne M Hines
*Assistant Examiner* — Jose M Diaz
(74) *Attorney, Agent, or Firm* — Muncy, Geissler, Olds & Lowe, P.C.

(57) ABSTRACT

An electronic device includes a substrate, a plurality of first retaining walls, a second retaining wall, and a light emitting element. The first retaining walls are arranged on the substrate. The second retaining wall is arranged on the substrate and disposed within one of the first retaining walls. The light emitting element is arranged on the substrate and disposed between the second retaining wall and one of the first retaining walls adjacent to the second retaining wall. In a cross section, there are a first distance between the light emitting element and the one of the first retaining walls, and a second distance between the light emitting element and the second retaining wall, wherein the second distance is smaller than the first distance.

20 Claims, 5 Drawing Sheets

ID DEVICE

CROSS REFERENCE TO RELATED APPLICATION

This application claims the benefits of the Chinese Patent Application Serial Number 202210159409.2, filed on Feb. 21, 2022, the subject matter of which is incorporated herein by reference.

BACKGROUND

1. Field of the Disclosure

The present disclosure relates to an electronic device and, more particularly, to an electronic device with improved light output efficiency.

2. Description of Related Art

With the advancement of technology and in order to meet the needs of consumers, the resolution and contrast requirements of electronic devices in the market are constantly increasing. The use of the direct type backlight module can improve the contrast of the electronic device through area light control, or can improve the resolution of the electronic device by adjusting the size of the diode, which is more applicable than the edge type backlight module.

However, electronic devices using direct-type backlight modules still encounter display quality problems such as existence of halo, poor light output efficiency, and obvious dark pattern areas.

Therefore, there is an urgent need to provide an electronic device, which can mitigate and/or obviate the problems of halo phenomenon, poor light output efficiency or obvious dark pattern areas.

SUMMARY

The present disclosure provides an electronic device, which includes a substrate; a plurality of first retaining walls arranged on the substrate; a second retaining wall arranged on the substrate and disposed within one of the first retaining walls; and a light emitting element arranged on the substrate and disposed between the second retaining wall and one of the first retaining walls adjacent to the second retaining wall, wherein, in a cross section, there are a first distance between the light emitting element and the one of the first retaining walls, and a second distance between the light emitting element and the second retaining wall, and the second distance is smaller than the first distance.

Other novel features of the disclosure will become more apparent from the following detailed description when taken in conjunction with the accompanying drawings.

DETAILED DESCRIPTION OF EMBODIMENT

Figure 1:
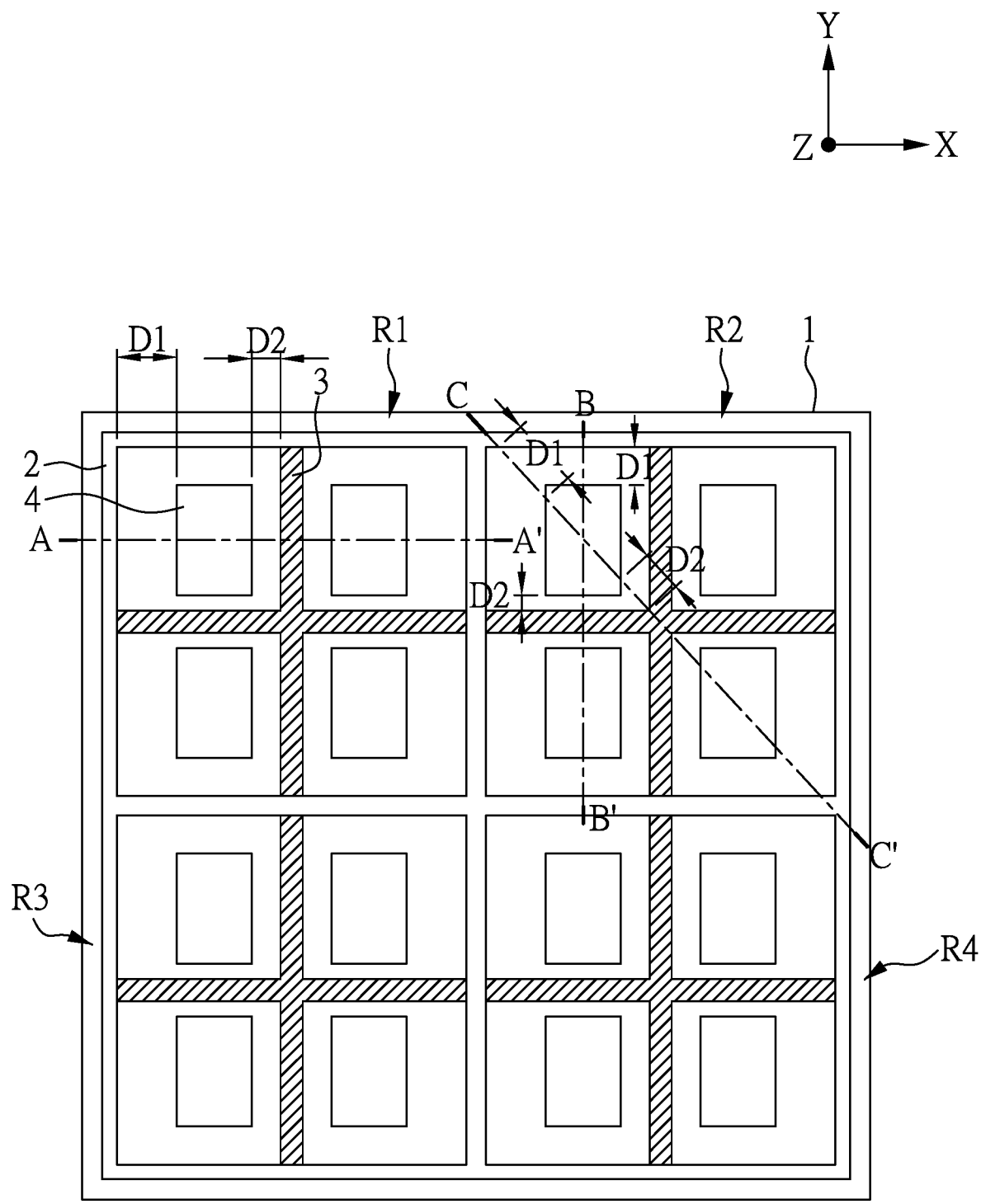
FIG. 1 is a schematic diagram illustrating part of the electronic device according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to . . . ".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the measurements of height, length, width and angle may be obtained by using an optical microscope, and the height or angle may be obtained by measuring a cross-sectional image in an electron microscope, but it is not limit thereto. In addition, any two values or directions used for comparison may have certain errors. Additionally, references in the presents disclosure to the terms, such as "equal to", "equal", "same", "substantially," or "approximately", generally mean within 10% of a given value or range. Furthermore, the terms "a given range is from a first value to a second value", "a given range is within a range from the first value to the second value" means that the given range includes the first value, the second value and other values therebetween. If the first direction is perpendicular to the second direction, the angle between the first direction and the second direction may be between 80 and 100 degrees; if the first direction is parallel to the second direction, the angle between the first direction and the second direction may be between 0 and 10 degrees.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

Figure 2:
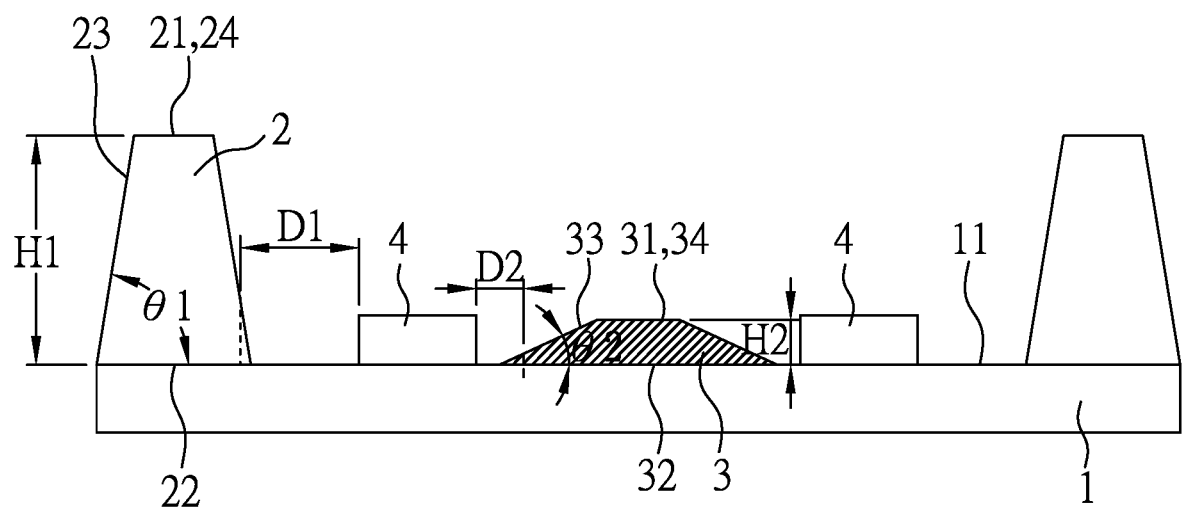
FIG. 2 is a schematic cross-sectional view taken along line A-A' of FIG. 1.

FIG. 1 is a schematic diagram illustrating part of the electronic device according to an embodiment of the present disclosure, and FIG. 2 is a schematic cross-sectional view taken along line A-A' of FIG. 1.

As shown in FIG. 1 and FIG. 2, the electronic device of the present disclosure may include: a substrate 1; a plurality of first retaining walls 2 arranged on the substrate 1, wherein by taking those shown in FIG. 1 as an example, in a top view, the plurality of first retaining walls 2 are respectively arranged on the substrate 1 in a surrounding manner; a second retaining wall 3 arranged on the substrate 1 and disposed within the first retaining wall 2; and a light emitting element 4 arranged on the substrate 1 and disposed between the second retaining wall 3 and one of the plurality of first retaining walls 2 adjacent to the second retaining wall 3, wherein, in a cross section, as shown in FIG. 2, there are a first distance D1 between the light emitting element 4 and the one of the plurality of first retaining walls 2, and a second distance D2 between the light emitting element 4 and the second retaining wall 3, and the second distance D2 is smaller than the first distance D1. In the electronic device of the present disclosure, with the arrangement of the retaining walls 2 and the second retaining wall 3, the light output efficiency of the electronic device may be improved or the quality problems such as halo phenomenon and obvious dark pattern areas may be alleviated.

In the present disclosure, the substrate 1 may be a rigid substrate or a flexible substrate. The material of the substrate 1 may be glass, metal, alloy, ceramic material or plastic material, but the present disclosure is not limited thereto. The plastic material may be, for example, polyimide (PI), polyethylene terephthalate (PET), polymethylmethacrylate (PMMA), etc., but the present disclosure is not limited thereto. In addition, the substrate 1 may further include a circuit layer to form a printed circuit board (PCB) or a flexible printed circuit board (FPC). In the present disclosure, the same or different materials may be used to prepare the first retaining wall 2 and the second retaining wall 3, and the first retaining wall 2 and the second retaining wall 3 may respectively include colloidal material and reflective material. Specific examples of the colloidal may include epoxy resin, phenolic resin, rubber, silicone, polyurethane, polyacrylate, or a combination thereof, but the present disclosure is not limited thereto. The reflective material may include a pigment, for example, may include a white pigment. Specific examples of the reflective material may include titanium dioxide, aluminum oxide, zinc oxide, zirconium oxide, and a mixture thereof, but the present disclosure is not limited thereto. In the present disclosure, the first retaining wall 2 and the second retaining wall 3 may be respectively arranged on the substrate 1 by a suitable coating method (e.g., a coating method such as spin coating, glue dispensing, etc.). In the present disclosure, although not shown, the light emitting element may include a chip, and an encapsulation layer arranged on the chip, wherein the encapsulation layer may include phosphor or quantum dots. Therefore, in the present disclosure, the light emitting element 4 may be a light emitting diode, such as a sub-millimeter light emitting diode (mini LED), a micro light emitting diode (micro LED), a quantum dot light emitting diode (quantum dot LED), etc., but the present disclosure is not limited thereto. The material of the encapsulation layer may be a transparent material to protect the chip and internal circuits, etc., without affecting the light emitted by the phosphor or quantum dots, wherein suitable materials may include epoxy resin, silicone, acrylic, polymethacrylic acid methyl ester, or a combination thereof, but the present disclosure is not limited thereto.

In the present disclosure, as shown in FIG. 1, the substrate 1 may have a plurality of regions, for example, may include a first region R1, a second region R2, a third region R3 and a fourth region R4, and the first region R1, the second region R2, the third region R3 and the fourth region R4 may be arranged in a 2×2 matrix, wherein, in the top view direction Z, each region corresponds to one of the plurality of first retaining walls 2. As shown in FIG. 1, the first region R1, the second region R2, the third region R3 and the fourth region R4 correspond to the plurality of first retaining walls 2, respectively. In other embodiments of the present disclosure, the plurality of regions of the substrate 1 may be arranged in an M×N matrix, where M and N are each a positive integer, such that the M×N matrix may be 3×3 matrix, 4×4 matrix, etc. for forming a substrate 1 of regular rectangle, or may be 2×3 matrix, 3×5 matrix, etc. for forming a substrate 1 of non-regular rectangle, but the present disclosure is not limited thereto. The first retaining wall 2 may be arranged around each region. More specifically, as shown in FIG. 1, the first retaining wall 2 in each region surrounds to form a rectangle, and adjacent two of the plurality of regions may share part of the first retaining wall 2. The second retaining wall 3 may be arranged in each region, and the second retaining wall 3 is arranged between two adjacent light emitting elements 4 in each region. In this embodiment, each region may include four light emitting elements, but the present disclosure is not limited thereto.

In the present disclosure, as shown in FIG. 1, there may be the first retaining wall 2 or the second retaining wall 3 arranged between two adjacent light emitting elements 4 and, since the first retaining walls 2 and the second retaining wall 3 may respectively contain reflective materials, which may be used to improve the light output efficiency or alleviate the phenomenon of obvious dark pattern areas. In the present disclosure, the first retaining wall 2 or the second retaining wall 3 may also provide a light blocking effect, so as to alleviate the light interference of the adjacent light emitting elements 4, and provide a collimated light source to eliminate the halo phenomenon. In addition, in the present disclosure, the first retaining wall 2 and the second retaining wall 3 may be connected to each other to form an integral body, so as to further improve the light output efficiency. In this embodiment, as shown in FIG. 1, the first retaining wall 2 has a rectangular shape, and the second retaining wall 3 has a cross shape, but the present disclosure is not limited thereto.

In the present disclosure, as shown in FIG. 2, the "first distance D1" is a distance between the first retaining wall 2 and the light emitting element 4 (for example, the minimum distance extending along the X direction), and the "second distance D2" is a distance between the second retaining wall 3 and the light emitting element 4 (for example, the minimum distance extending along the X direction). In some embodiments, the "first distance D1" is a distance between the position at 15% of height of the first retaining wall 2 and the light emitting element 4 (for example, the minimum distance extending along the X direction), and the "second distance D2" is a distance between the position at 15% of height of the second retaining wall 3 and the light emitting element 4 (for example, the minimum distance extending along the X direction). In the present disclosure, "position at 15% of height" refers to the position from the bottom surface of the first retaining wall 2 or the second retaining wall 3 to the corresponding 15% of height, or refers to the position from the upper surface 11 of the substrate 1 to the corresponding 15% of height of the first retaining wall 2 or second retaining wall 3. In one embodiment of the present disclosure, the ratio of the second distance D2 to the first distance D1 may be between 0.25 and 0.65, for example between 0.28 and 0.62, such as 0.3, 0.35, 0.4, 0.45, 0.5, 0.55, and 0.6, but the present disclosure is not limited thereto. In one embodiment of the present disclosure, the first distance D1 may be 1.45 to 1.6 millimeters (mm), such as 1.48, 1.51, 1.54, and 1.57 millimeters (mm), and the second distance D2 may be 0.45 to 0.9 millimeters (mm), for example, may be 0.5, 0.55, 0.6, 0.65, 0.7, 0.75, 0.8, and 0.85 millimeters (mm) When the first distance D1 and the second distance D2 meet the aforementioned ranges, it may obtain better light output efficiency or taste effect.

In the present disclosure, the first retaining wall 2 has a first height H1, the second retaining wall 3 has a second height H2, and the ratio of the second height H2 to the first height H1 may be between 0.35 and 0.7, for example, may be between 0.38 and 0.65, such as 0.4, 0.45, 0.5, 0.55, and 0.6, but the present disclosure is not limited thereto. The "first height H1" and "second height H2" respectively refer to the height of the first retaining wall 2 (for example, the maximum height extending from the bottom of the first retaining wall 2 along the Z direction) and the height of the second retaining wall 3 (for example, the maximum height extending from the bottom of the second retaining wall 3 along the Z direction). In the present disclosure, the first height H1 may be 0.25 to 0.4 millimeters (mm), such as 0.28, 0.31, 0.34, and 0.37 millimeters (mm), and the second height H2 may be 0.12 to 0.2 millimeters (mm), such as 0.13, 0.14, 0.15, 0.16, 0.17 and 0.18 millimeters (mm) When the first height H1 and the second height H2 meet the aforementioned ranges, it is able to obtain better light output efficiency or taste effect.

In a cross-sectional view of the present disclosure, as shown in FIG. 2, the first retaining wall 2 has a first top edge 21, a first bottom edge 22 and a first side edge 23. The first side edge 23 connects the first top edge 21 and the first bottom edge 22, wherein the width of the first top edge 21 may be 0.2 to 0.3 millimeters (mm), such as 0.22, 0.24, 0.26 and 0.28 millimeters (mm) The width of the first bottom edge 22 may be 0.5 to 0.8 millimeters (mm), such as 0.55, 0.6, 0.65, 0.7, 0.75 millimeters (mm). In one embodiment of the present disclosure, the ratio of the width of the first top edge 21 to the width of the first bottom edge 22 is between 0.25 and 0.5, such as 0.3, 0.35, 0.4 and 0.45. The second retaining wall 3 has a second top edge 31, a second bottom edge 32 and a second side edge 33. The second side edge 33 connects the second top edge 31 and the second bottom edge 32, wherein the width of the second top edge 31 may be 0.85 to 0.95 millimeters (mm), such as 0.87, 0.89, 0.91 and 0.93 millimeters (mm), and the width of the second bottom edge 32 may be 1.8 to 2.8 millimeters (mm), such as 1.9, 2, 2.1, 2.2, 2.3, 2.4, 2.5, 2.6, and 2.7 millimeters (mm) In one embodiment of the present disclosure, the ratio of the width of the second top edge 31 to the width of the second bottom edge 32 is between 0.3 and 0.46, such as 0.32, 0.34, 0.36, 0.38, 0.4, 0.42 and 0.44. When the first top edge 21, the first bottom edge 22, the second top edge 31 and the second bottom edge 32 meet the aforementioned ranges, better light output efficiency or taste effect may be obtained. In one embodiment of the present disclosure, the first bottom edge 22 of the first retaining wall 2 and the second bottom edge 32 of the second retaining wall 3 may be defined to be at 15% of the height of the corresponding retaining wall. In one embodiment of the present disclosure, as shown in FIG. 2, the top surface 24 of the first retaining wall 2 and the top surface 34 of the second retaining wall 3 may be each a substantially flat surface, so as to further improve the light output efficiency or taste effect. In one embodiment of the present disclosure, the top surface 24 of the first retaining wall 2 and the top surface 34 of the second retaining wall 3 may also be arc surfaces, respectively. When the top surface 24 of the first retaining wall 2 and the top surface 34 of the second retaining wall 3 are each a curved surface, the first top edge 21 of the first retaining wall 2 and the second top edge 31 of the second retaining wall 3 may be defined to be at 80% to 90% of the height of the corresponding retaining wall, such as 81%, 82%, 83%, 84%, 85%, 86%, 87%, 88% and 89% thereof.

In addition, as shown in FIG. 2, a first angle θ1 may be formed between the first bottom edge 22 and the first side edge 23 of the first retaining wall 2, wherein the first angle θ1 may be between 50° and 65°, such as 53°, 56°, 59° and 62°, and a second angle θ2 may be formed between the second bottom edge 32 and the second side edge 33 of the second retaining wall 3, wherein the second angle θ2 may be between 10° and 20°, such as 12°, 14°, 16° and 18°. When the first angle θ1 and the second angle θ2 meet the aforementioned ranges, better light output efficiency or taste effect may be obtained.

In this embodiment, FIG. 2 is a schematic cross-sectional view taken along the line A-A' of FIG. 1. It is noted that, in other embodiments of the present disclosure, when taking a cross section along line B-B' of FIG. 1 or along line CC' of FIG. 1, a schematic cross-sectional view similar to that of FIG. 2 may also be obtained. Therefore, the features of the cross-sectional view of line BB' and the cross-sectional view of line C-C' are similar to those in FIG. 2, and thus a detailed description is deemed unnecessary.

Figure 3A:
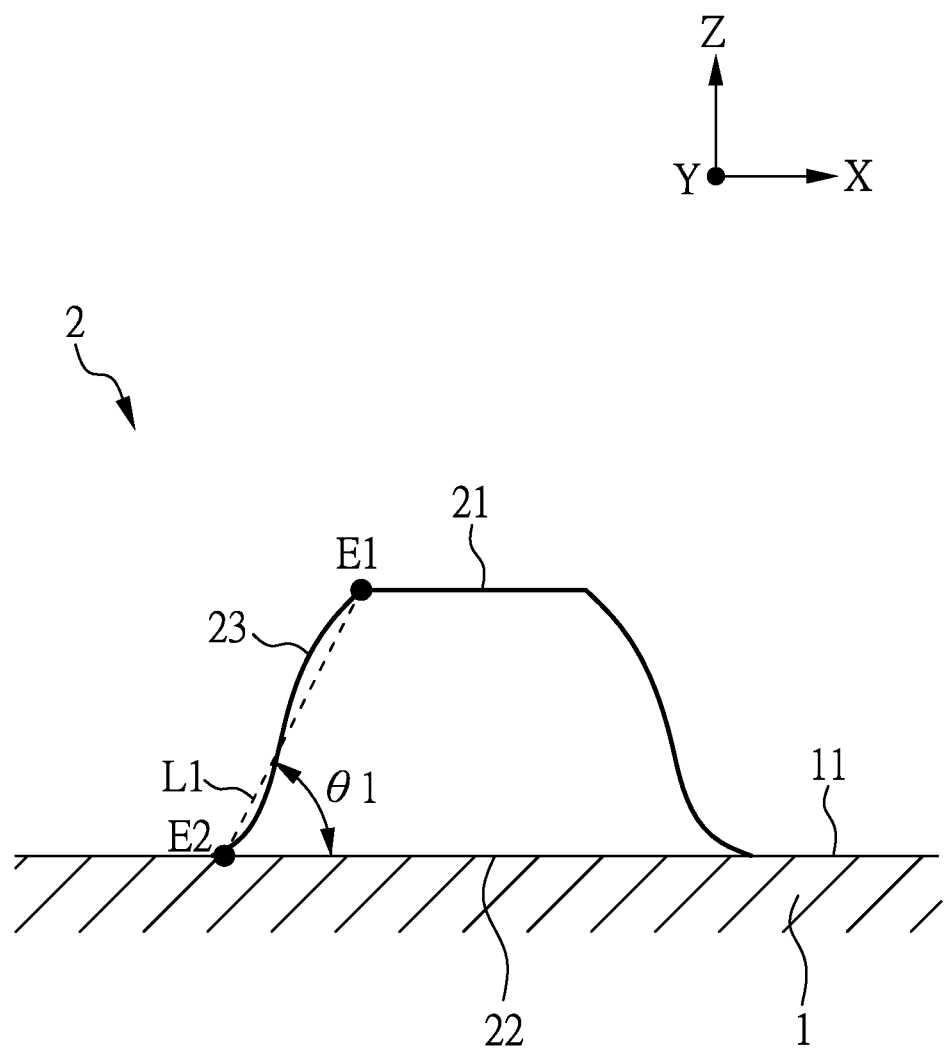
FIG. 3A is a schematic cross-sectional view of the first retaining wall according to an embodiment of the present disclosure.

FIG. 3A is a schematic cross-sectional view of the first retaining wall 2 according to an embodiment of the disclosure. The first retaining wall 2 of FIG. 3A is similar to that of FIG. 2 except for the following differences.

As shown in FIG. 3A, the first side edge 23 of the first retaining wall 2 may have an arc shape. In addition, in the cross-sectional view, the first top edge 21 of the first retaining wall 2 has a first end E1, the first bottom edge 22 has a second end E2, and the first end E1 and the second end E2 are connected to provide a reference line L1. The "first angle θ1" may be the angle formed between the first bottom edge 22 of the first retaining wall 2 and the reference line L1. Similarly, although not shown, the second side edge 33 of the second retaining wall 3 may also have an arc shape. Therefore, the "second angle θ2" may be the angle between the second bottom edge 32 of the second retaining wall 3 and another reference line which may be the connection between the end point of the second top edge 31 of the second retaining wall 3 and the end point of the second bottom edge 32 of the second retaining wall 3.

Figure 3B:
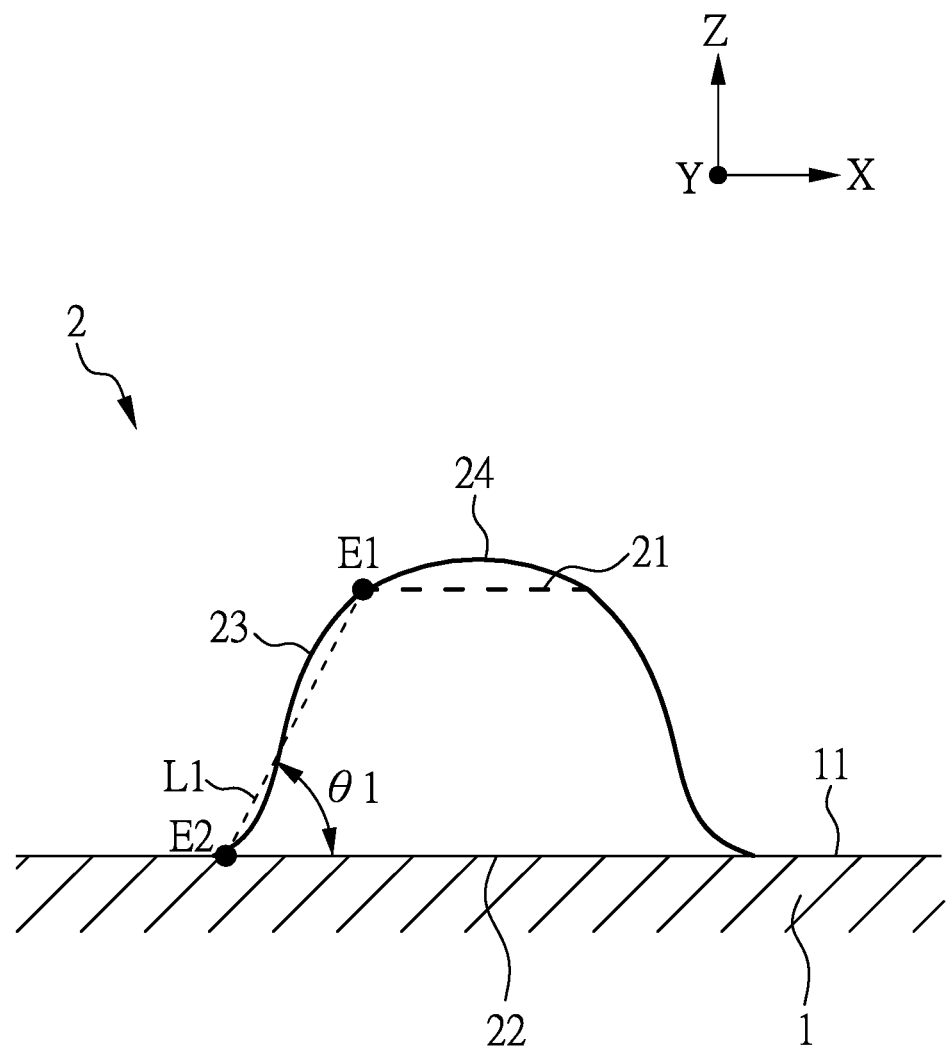
FIG. 3B is a schematic cross-sectional view of the first retaining wall according to another embodiment of the disclosure.

FIG. 3B is a schematic cross-sectional view of the first retaining wall 2 according to another embodiment of the present disclosure. The first retaining wall 2 of FIG. 3B is similar to that of FIG. 3A except for the following differences.

In one embodiment of the present disclosure, as shown in FIG. 3B, the top surface 24 of the first retaining wall 2 is an arc surface. When the top surface 24 of the first retaining wall 2 is an arc surface, the first top edge 21 of the first retaining wall 2 may be defined to be at 80% to 90% of the height of the first retaining wall 2, such as 81%, 82%, 83%, 84%, 85%, 86%, 87%, 88% and 89% thereof. More specifically, as shown in FIG. 3B, the first top edge 21 is the edge at 80% to 90% of the height of the first retaining wall 2 and in parallel to the X direction. Therefore, in the cross-sectional view, the first end point E1 of the first top edge 21 of the first retaining wall 2 and the second end point E2 of the first bottom edge 22 may be connected to form a reference line L1. The "first angle θ1" may be the angle formed between the first bottom edge 22 of the first stop wall 2 and the reference line L1. Similarly, although not shown, the top surface 34 of the second retaining wall 3 may also be an arc surface. Therefore, the second top edge 31 and the second angle θ2 are defined similar to the first top edge 21 and the first angle θ1, and thus a detailed description is deemed unnecessary.

Figure 4:
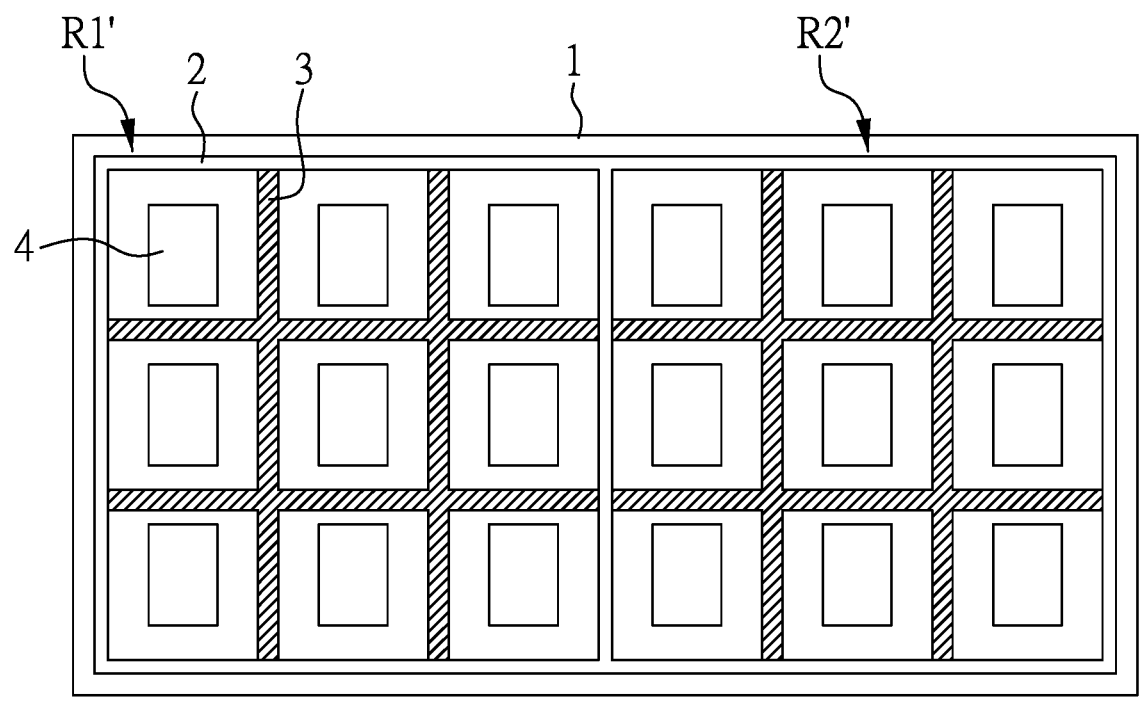
FIG. 4 is a schematic diagram illustrating part of the electronic device according to another embodiment of the disclosure.

FIG. 4 is a schematic diagram of part of the electronic device according to another embodiment of the present disclosure. The electronic device of FIG. 4 is similar to that of FIG. 1 except for the following differences.

As shown in FIG. 4, in this embodiment, the substrate 1 may have a plurality of regions, for example, may include a first region R1' and a second region R2', and the first region R1' is disposed adjacent to the second region R2', but the present disclosure is not limited thereto. Although not shown, in other implementation aspects of this embodiment, the substrate 1 may further include a third region and a fourth region, and the first region R1', the second region R2', the third region and the fourth region may be arranged in a 3×3 matrix. In other embodiments of the present disclosure, the plurality of regions of the substrate 1 may be arranged in an M×N matrix, where M and N are each a positive integer, such that the M×N matrix may be 2×2 matrix, 4×4 matrix, etc. for forming a substrate 1 of regular rectangle, or may be 2×3 matrix, 3×5 matrix, etc. for forming a substrate 1 of non-regular rectangle, but the present disclosure is not limited thereto. In this embodiment, as shown in FIG. 4, each area may include nine light emitting elements, the first retaining wall 2 may be arranged around each area, and the second retaining wall 3 may be arranged between two adjacent light emitting elements 4 in each area. Therefore, the first retaining wall 2 may have a rectangular shape, and the second stop wall 3 may have an intersecting parallels shape (i.e., shape of #), but the present disclosure is not limited thereto.

In the present disclosure, the electronic device may further include an optical film sheet (not shown) disposed on the substrate 1, wherein the substrate 1, the first retaining wall 2, the second retaining wall 3, the light emitting element 4 and the optical film sheet may form a backlight module. In the present disclosure, the electronic device may further include a display panel (not shown), and the display panel may be operatively assembled with the backlight module to form a display device. The display device may be applied to any device known in the art that requires a display screen, for example, a display device needs to display images such as a monitor, a mobile phone, a notebook computer, a camcorder, a camera, a music player, a mobile navigation device and a television set. In addition, the display panel may also be used together with the touch panel to form a touch display device.

The aforementioned specific embodiments should be construed as merely illustrative, and not limiting the rest of the present disclosure in any way.

What is claimed is:

1. An electronic device, comprising:
   a substrate;
   a plurality of first retaining walls arranged on the substrate;
   a second retaining wall arranged on the substrate and disposed within one of the first retaining walls; and
   a light emitting element arranged on the substrate and disposed between the second retaining wall and one of the first retaining walls adjacent to the second retaining wall, wherein, in a cross section, there are a first distance between the light emitting element and the one of the first retaining walls, and a second distance between the light emitting element and the second retaining wall, and the second distance is smaller than the first distance.

2. The electronic device as claimed in claim 1, wherein a ratio of the second distance to the first distance is between 0.25 and 0.65.

3. The electronic device as claimed in claim 1, wherein the first distance is a distance between 15% of a height of the one of the first retaining walls and the light emitting element, and the second distance is a distance between 15% of a height of the second retaining wall and the light emitting element.

4. The electronic device as claimed in claim 1, wherein the one of the first retaining walls has a first height, the second retaining wall has a second height, where the ratio of the second height to the first height is between 0.35 and 0.7.

5. The electronic device as claimed in claim 1, wherein, in the cross section, the one of the first retaining walls has a first bottom edge and a first side edge, and a first angle is formed between the first bottom edge and the first side edge, where the first angle is between 50° and 65°.

6. The electronic device as claimed in claim 1, wherein, in the cross section, the second retaining wall has a second bottom edge and a second side edge, and a second angle is formed between the second bottom edge and the second side edge, where the second angle is between 10° and 20°.

7. The electronic device as claimed in claim 1, wherein, in the cross section, the one of the first retaining walls has a first top edge and a first bottom edge, where a ratio of a width of the first top edge to a width of the first bottom edge is between 0.25 and 0.5.

8. The electronic device as claimed in claim 1, wherein in the cross section, the second retaining wall has a second top edge and a second bottom edge, where a ratio of a width of the second top edge to a width of the second bottom edge is between 0.3 and 0.46.

9. The electronic device as claimed in claim 1, wherein at least one of the first retaining walls or the second retaining wall includes a reflective material.

10. The electronic device as claimed in claim 1, wherein at least one of the first retaining walls or the second retaining wall includes a colloidal material.

11. The electronic device as claimed in claim 1, wherein the substrate is provided with a plurality of regions, each region corresponds to one of the first retaining walls, the first retaining wall in each region surrounds to form a rectangle, and adjacent two of the regions share part of the first retaining wall.

12. The electronic device as claimed in claim 11, wherein each region includes a plurality of light emitting elements, the second retaining wall is arranged in each region, and the second retaining wall is arranged between two adjacent light emitting elements in each region.

13. The electronic device as claimed in claim 11, wherein the second retaining wall has a cross shape or an intersecting parallels shape.

14. The electronic device as claimed in claim 1, wherein the first retaining wall and the second retaining wall are connected to each other to form an integral body.

15. The electronic device as claimed in claim 7, wherein the first retaining wall has a top surface which is a flat surface.

16. The electronic device as claimed in claim 8, wherein the second retaining wall has a top surface which is a flat surface.

17. The electronic device as claimed in claim 7, wherein the first retaining wall has a top surface which is an arc surface.

18. The electronic device as claimed in claim 8, wherein the second retaining wall has a top surface which is an arc surface.

19. The electronic device as claimed in claim 5, wherein the first side edge has an arc shape.

20. The electronic device as claimed in claim 6, wherein the second side edge has an arc shape.

* * * * *